Nov. 5, 1968 D. W. HUSTED 3,409,244

REEL SPINDLE

Filed June 30, 1967 2 Sheets-Sheet 1

INVENTOR

DAVID W. HUSTED

BY Beaman & Beaman

ATTORNEYS

INVENTOR

DAVID W. HUSTED

BY Beaman & Beaman

ATTORNEYS

United States Patent Office 3,409,244

Patented Nov. 5, 1968

3,409,244

REEL SPINDLE

David W. Husted, Ann Arbor, Mich., assignor to Baia Corporation, Jackson, Mich., a corporation of Michigan Filed June 30, 1967, Ser. No. 650,409
10 Claims. (Cl. 242—68.3)

ABSTRACT OF THE DISCLOSURE

A reel spindle for supporting film reels having differently dimensioned reel supporting portions wherein the spindle is able to support and retain reels having differently sized spindle receiving holes or openings, locking means being utilized upon the spindle to maintain the reel thereon when in use.

*Background of the invention*

The invention pertains to the field of reel spindles, such as are used to support movie film reels. The spindle is mounted upon a rotatable support, and the reel is maintained and oriented upon the support by the spindle being received within a centrally located reel opening. The invention particularly pertains to a "universal" spindle capable of being employed with at least two types of reel openings.

Film reels normally include a centrally defined spindle receiving opening coincident with the reel axis. The opening is normally cylindrical and at least one radially extending key slot is defined in the reel intersecting the cylindrical opening. Usually, with 8 mm. film, three radially disposed key slots intersect the reel opening. Conventional reel spindles include a cylindrical supporting surface having a radially extending key projecting therefrom. The reel opening is received upon the cylindrical spindle surface, and is of a diameter only slightly larger than the spindle surface. The reel key slot is aligned with the spindle key in order to receive the key therein, and thus lock the spindle and reel against relative angular rotation.

Reel spindles are constructed and dimensioned to accommodate a particular reel opening size and configuration. Equipment using film, such as movie projectors, film editors or viewers and the like, are provided with standard diameter spindles in order to accommodate the particular size of opening formed in a given type of film reel. For instance, film reel manufacturers have standardized upon the diameter of the reel opening for conventional 8 mm. film, and all conventional 8 mm. equipment, regardless of the manufacturer, is provided with reel spindles which will properly support any conventional 8 mm. reel.

An improved 8 mm. movie film is now available which is commonly known as Super 8 mm. As Super 8 mm. film differs from conventional 8 mm. movie film by the size of the image, spacing of the film sprocket perforations and location of the film sprocket perforations upon the film, photographic equipment capable of handling conventional 8 mm. film will not accommodate Super 8 mm. film. Conversely, Super 8 mm. film cannot be used in equipment originally designed for conventional 8 mm. film.

Photographic equipment manufacturers are currently producing "dual format" equipment, such as projectors, editors and viewers which are capable of handling both conventional 8 mm. and Super 8 mm. movie film. Such equipment is usually provided with dual optical systems, reel sprockets and other components which directly engage the film, and means are provided whereby such dual components may be selectively placed into an operative position depending upon the type of film being used. One of the problems existing in "dual format" photographic equipment arises from the difference in construction of conventional 8 mm. film reels and Super 8 mm. film reels. In order to prevent the inadvertent usage of Super 8 mm. film with conventional 8 mm. equipment, Super 8 mm. reels are provided with a spindle opening of a much greater diameter than conventional 8 mm. film reels. Thus, as a Super 8 mm. film reel is so loosely positioned on a conventional 8 mm. reel spindle, as to be inoperative, the operator is immediately aware that the Super 8 mm. film cannot be used with the conventional 8 mm. equipment. Conversely, as the diameter of the reel spindle of Super 8 mm. equipment is considerably larger than the diameter of the reel opening for conventional 8 mm. film the conventional 8 mm. film cannot be placed upon a Super 8 mm. reel spindle.

While attempts have been made to devise a "universal" reel spindle which would handle both conventional and Super 8 mm. film, such attempts have been generally unsuccessful, and a simple and inexpensive solution to the problem has not heretofore been proposed. Currently, dual format equipment usually uses an adaptor bushing to permit both types of film reels to be mounted on the same spindle.

*Summary of the invention*

The reel spindle of the invention is of a "universal" type wherein both conventional and Super 8 mm. movie film reels can be supported upon the spindle in an operative manner without requiring an adaptor or other accessory. The reel spindle of the invention is of an economical manufacture, and may be easily operated by the unskilled and those not mechanically inclined.

In essence, the spindle of the invention includes first and second axial portions. The first axial portion is of a diameter able to accommodate conventional 8 mm. reels. The second axial portion is of a larger diameter and dimension than the first portion and is able to accommodate and support Super 8 mm. film reels. The components of the reel spindle are such that either type of film reel need merely be inserted upon the spindle and rotated relative thereto until the keys defined upon the spindle mate with key slots defined in the reel.

Separate keys are defined upon the spindle for cooperating with the two sizes of film reels. The keys used to cooperate with the conventional 8 mm. reel are of such dimension as to support the bore of Super 8 mm. film reels, in conjunction with the second axial portion of the spindle. The keys adapted to lock conventional and Super 8 reels with respect to the spindle are angularly offset with respect to each other to produce the desired relationship between the bore of Super 8 mm. film reels and the keys used to lock conventional 8 mm. film reels.

Film reel locking or retaining means are defined upon the spindle to insure maintaining the film reel upon the proper spindle portion. Such reel retaining means includes a lever pivotally mounted upon the spindle having cam means associated therewith cooperating with a spring biased detent located within the spindle. The detent produces a biasing force upon the retainer which is transmitted to the reel and will retain the reel upon the spindle. The retaining means automatically shifts to an inoperative position when the operator axially moves the reel upon the spindle in a reel removal direction, and the retainer remains in this noninterfering position when another reel is being placed upon the spindle.

The reel spindle in accord with the invention may be economically molded in high production equipment, and may be primarily formed of relatively inert, synthetic plastic materials.

*Brief description of the drawing*

The advantages and operation of a reel spindle in accord with the invention will be appreciated from the following description and accompanying drawings wherein.

*Description of the preferred embodiment*

Figures 1, 2, 3, 4:
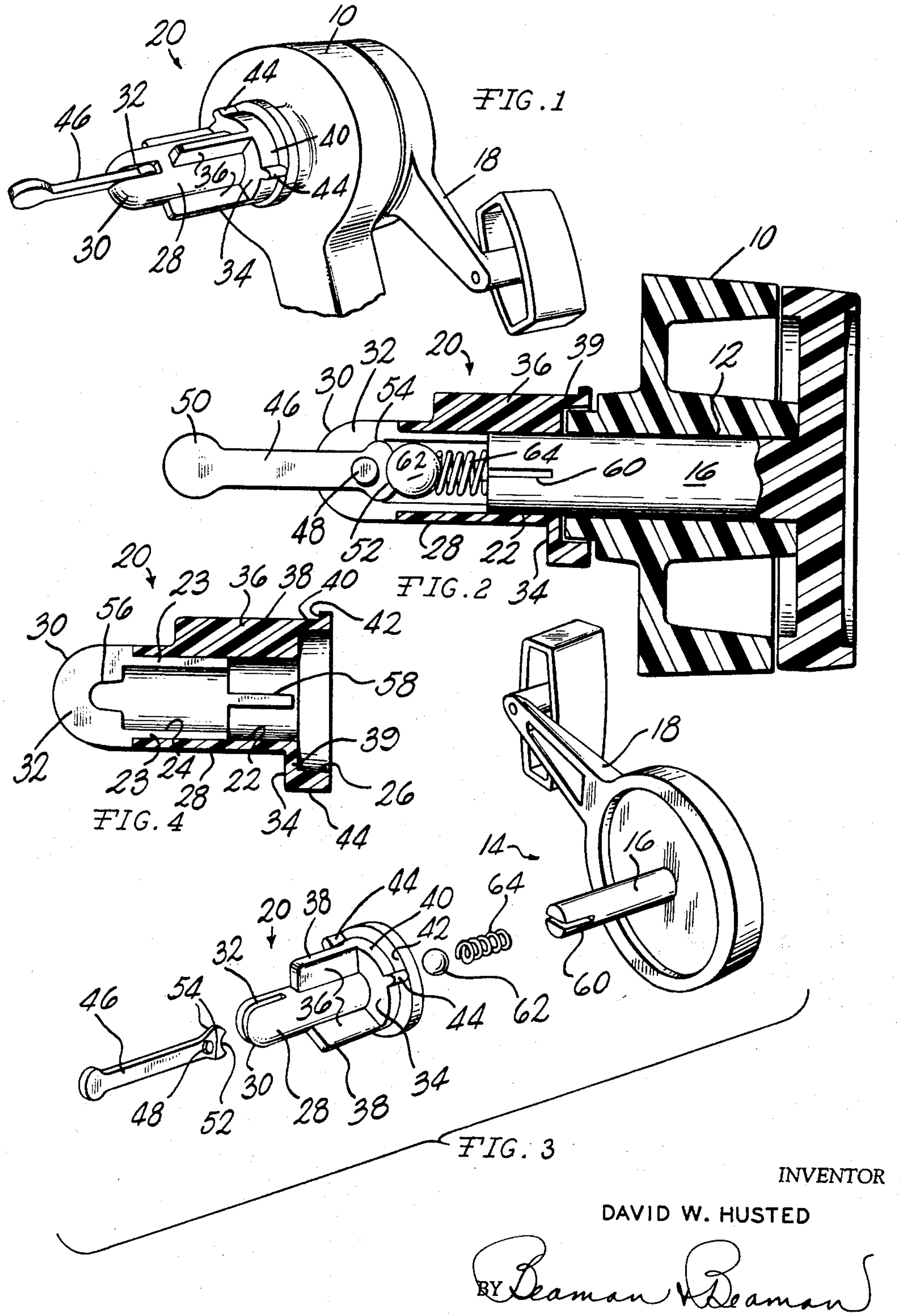
FIG. 1 is a perspective view of the reel spindle and the supporting structure prior to a film reel being placed thereon.
FIG. 2 is a diametrical elevational sectional view of a reel spindle and supporting structure in accord with the invention illustrating the reel retainer in the loading or inoperative position.
FIG. 3 is a perspective exploded view of the components of the reel spindle.
FIG. 4 is a diametrical elevational sectional view of the reel spindle body, per se.

The spindle structure illustrated in the drawings is representative of photographic equipment with which the invention may be employed. For instance, the member 10 represents the support arm for a film reel for a movie film viewer, editor, projector, or other apparatus using film reels and is provided with a cylindrical bore 12.

The spindle support 14, in the illustrated embodiment, consists of a cylindrical shaft 16 adapted to be rotatably received within the bore 12. One end of the shaft 16 is provided with a crank handle 18 upon which a knob is rotatably mounted. The crank 18 and knob are the type of structure which is commonly employed with manually operated movie editors and viewers, and it will be understood that the shaft 16 may be motor driven or otherwise selectively rotated.

The reel spindle body, per se, hereafter referred to as the reel spindle, is indicated at 20 and is of an elongated configuration, and is preferably molded of a synthetic plastic material commonly known as Delrin. The spindle is of a generally cylindrical configuration and includes an enlarged cylindrical bore portion 22. The spindle also includes a reduced diameter bore portion 24 of a cylindrical configuration which is coaxial with the bore 22 and is axially slotted at 23 at opposed locations. The spindle is recessed at 26 to provide clearance with the member 10 as is apparent in FIG. 2.

Externally, the spindle 20 is provided with a cylindrical surface 28 constituting a first axially extending reel supporting portion of the spindle. The outer or free end of the spindle is provided with a rounded nose 30 and a diametrically extending slot 32 is defined therein which intersects bore 24 and through which the reel retaining or locking lever protrudes, as will be later described. The cylindrical surface 28 includes an inner portion or end defined by the radially extending shoulder surface 34 perpendicularly disposed to the axis of the spindle and radially extending from the surface. Three radially extending keys 36 integrally project from the cylindrical surface 28 at 120° intervals about the circumference thereof and are of an axial length slightly greater than one half of the axial length of the surface 28. The keys 36 merge into the radial shoulder surface 34 and each include an outer edge 38.

A second axially extending reel supporting portion defined upon the spindle 20 is formed by a radial projection 39 upon which is formed a cylindrical surface 40, concentric with the surface 28 and of a radial dimension equal to the radial dimension of the key edges 38. The axial portion surface 40 is defined by a radially extending shoulder wall 42 axially spaced from the shoulder 34 wherein the axial dimension of the surface 40 is defined by the radial shoulders 34 and 42.

Three keys 44 are illustrated as being formed upon the spindle in axial alignment with the axial portion surface 40. The keys 44 radially extend from the cylindrical surface 40 and are disposed at 120° intervals thereabout.

From FIGS. 3 and 8, it will be noted that the keys 36 are angularly displaced about the axis of the spindle 20 60° with respect to the keys 44 for a purpose which will be later described.

The film reel retainer takes the form of an elongated lever 46, which, like the spindle 20 and the shaft 16 may be molded of synthetic material such as Delrin. The lever 46 is provided with a pair of pivot bosses 48, a boss being located on each side of the lever, and the outer end of the lever is formed with a bulbous portion 50, while the inner end of the lever is formed with a cam and detent recess portion. The recess 52 is of a circular concave configuration and is centrally disposed relative to the longitudinal axis of the lever 46. Upon each side of the recess 52 a cam portion 54 is formed which is of a convex configuration, and is related to the pivot 48 in such a manner that the detent maintains a biasing force upon the lever when shifted to the operative or locking position.

The outer end of the lever 46 extends from the slot 32 and a pair of recesses 56 are formed internally within the bifurcated or slotted portion of the spindle for receiving the lever pivot bosses 48. In this manner the lever 46 is pivotally mounted within the spindle 20 while extending through the slot 32.

The spindle bore portion 22 is provided with a pair of diametrically opposed key portions 58, FIG. 4, and the shaft 16 is provided with a key slot 60, FIG. 3. The shaft 16 is pressed into the spindle bore 22 such that the keys 58 are received within the slot 60. Preferably, a press fit between the shaft 16 and the spindle bore 22 exists, and a solvent may be used to bond this connection.

Prior to inserting the shaft 16 into the spindle bore 22 a detent ball 62 is located within the spindle bore 24 and a compression spring 64 is disposed between the ball detent and the end of the shaft, when the assembly is complete.

The cooperation of the ball detent 62 with the lever recess 52, and the cam surfaces 54, is such that the detent will maintain the lever in the loading or inoperative position shown in FIG. 2. Rotation of the lever 46 within the slot 32 biases the ball detent toward the shaft 16 causing the detent to ride upon the surface of a cam portion 54. After the detent engages the "high" point of the associated cam the biasing force of the spring 64 will cause the lever 46 outer end to be resiliently biased toward the spindle support member 10, as shown in FIGS. 5 and 7.

In operation, the components will be initially related as shown in FIG. 2. The spindle is now ready to receive a film reel. Assuming a conventional 8 mm. film reel is to be placed upon the spindle 20, the conventional 8 mm. film reel 66 will include a central spindle receiving opening 68 of cylindrical configuration. Ribs 70 are defined upon the reel and three radially extending key slots 72 are defined in the reel intersecting the cylindrical opening 68. The diameter of the spindle surface 28 is slightly less than the diameter of the reel opening 68, and thus the reel 66 may be slipped upon the spindle surface 28 upon the alignment of the keys 36 with the key slots 72 of the reel. The conventional 8 mm. reel is axially moved on the spindle surface 28 until the edge of the reel engages the shoulder 34, FIG. 5. Thereupon the lever 46 is pivoted from the position of FIG. 2, to the position of FIG. 5 wherein the outer portion 50 of the lever will engage the reel structure and bias the reel 66 toward the shoulder 34. Thus, the lever 46 will maintain the reel upon the spindle 20 in the orientation determined by the shoulder 34. Relative rotation between the reel spindle and the reel is prevented by the keys 36, and mating key slots 72.

Figure 5:
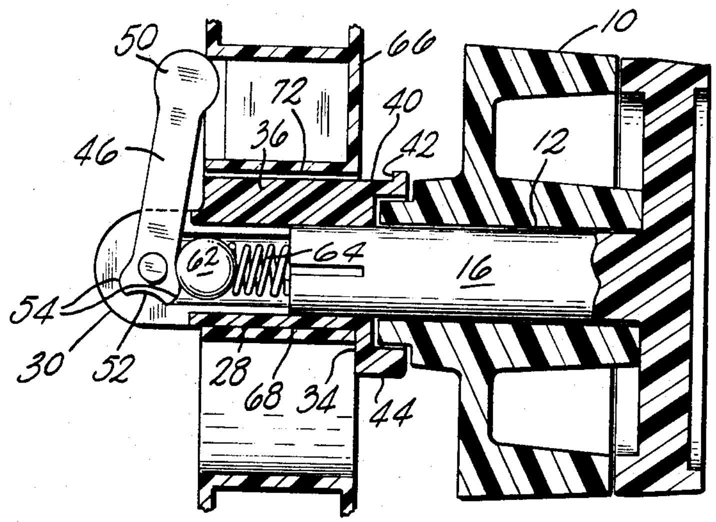
FIG. 5 is an elevational diametrical sectional view of a reel spindle in accord with the invention illustrating a conventional 8 mm. film reel being located thereon, and the reel retainer being pivoted to the operative position.

When it is desired to remove the reel 66 from the spindle 20 the operator merely moves the reel to the left, FIG. 5, which will pivot the lever 46 to the position of FIG. 2 wherein the lever is axially aligned with the axis of the reel and the detent engages recess 52.

Figure 8:
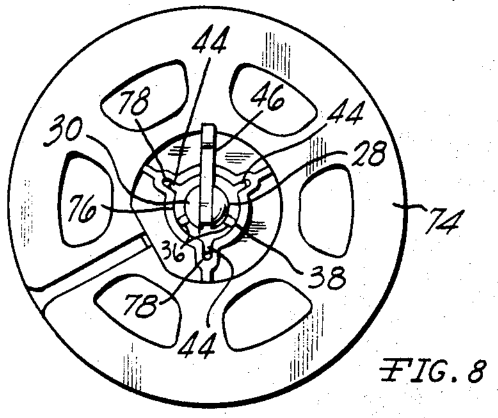
FIG. 8 is an elevational view of the embodiment of FIG. 7 as taken from the left.
Figure 6:
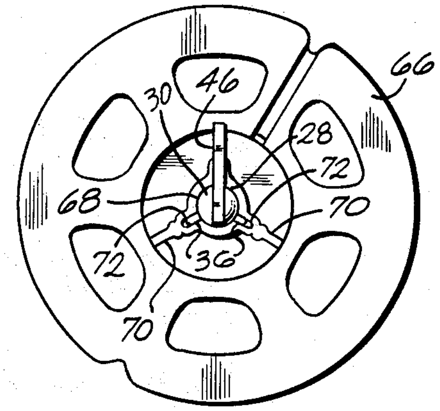
FIG. 6 is an elevational view taken from the left of FIG. 5.
Figure 7:
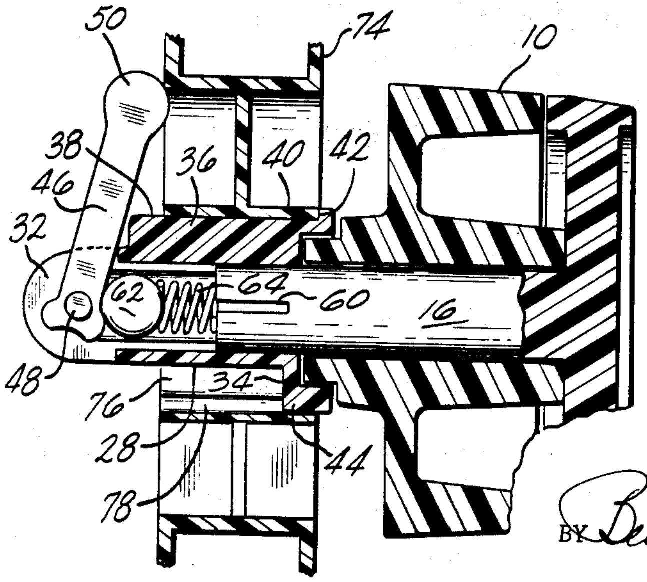
FIG. 7 is a diametrical elevational sectional view similar to FIG. 5, illustrating the relationship of the components when a Super 8 mm. movie film is mounted upon the spindle.

A Super 8 mm. film reel 74 is illustrated in FIGS. 7 and 8. The reel 74 includes a central spindle receiving opening 76 of a cylindrical configuration and also includes three radially disposed key slots 78 defined in the reel intersecting the cylindrical opening 76. The diameter of the cylindrical opening 76 of a Super 8 mm. reel is substantially larger than that of the opening 68 of the conventional 8 mm. reel, as will be apparent from comparison with FIG. 6.

In accord with the invention the radial distance of the key edges 38 and radius of surface 40 from the axis of the spindle 20 is only slightly less than the radius of the reel opening. Thus, upon placing the reel 74 upon the spindle 20 in a manner wherein the keys 36 are not in angular alignment with the key slots 78, the keys 36 will concentrically relate the reel 74 to the reel spindle. The reel 74 is axially placed and oriented on the reel spindle 20 such that the innermost portion of the reel opening 76 will be received upon the cylindrical surface 40, FIG. 7. In order to place the reel 74 upon the spindle cylindrical surface 40, it is necessary to orient the reel key slots 78 to receive the keys 44. Upon such orientation occurring the reel 74 may be slipped over the axial portion 40 for engagement with the radial shoulder 42, FIG. 7.

As alignment of the keys 44 with the reel key slots 78 misaligns the keys 36 with respect to the key slots the relationship of FIG. 8 will be maintained wherein the key edges 38 and surface 40 support the reel throughout its entire width, FIG. 7. In this manner the reel 74 is adequately supported upon the spindle, and the keys 44 will angularly lock the reel 74 to the spindle 20 to insure rotation of the reel when the spindle rotates.

Removal of the reel from the spindle is easily accomplished by merely moving the reel to the left, FIG. 7 which will pivot the lever 46 to the position of FIG. 2.

It will therefore be appreciated that either conventional or Super 8 mm. film reels may be used with the spindle of the invention. The operator merely places the reel upon the spindle and rotates the reel or spindle until the proper keys orient with the desired reel key slots. Regardless of whether conventional or Super 8 mm. film is being used, the operator will quickly sense when the reel is properly located upon the spindle. The resilient biased action of the lever 46 will maintain the reel against the appropriate shoulder, such as the shoulder 34, FIG. 5, or the shoulder 42, FIG. 7.

The components of the invention, except for the ball detent 62 and spring 64 may be readily formed by molding operations, and thus the manufacture and the assembly of the spindle is of an economical nature. The "universal" spindle of the invention is of a concise nature being of a dimension substantially corresponding to that of single purpose spindles and its use with editors, viewers and projectors may be readily accomplished without departing from the spirit and scope thereof, and it is intended that the invention be defined only by the following claims.

I claim:

1. A reel spindle for selectively supporting reels having different sized spindle receiving openings defined therein each consisting of a cylindrical bore intersected by at least one radially disposed key slot comprising, in combination, a reel spindle support, means rotatably mounting said support, an elongated reel spindle mounted upon said support having an axis coincident with the axis of rotation of said support, a cylindrical surface defined upon a first reel supporting axial portion of said spindle concentric wtih said spindle axis and having a first accessible end and a second end disposed toward said support member, axial extending projection means defined on said spindle adjacent said second end and radially outwardly disposed of said cylindrical surface, said projection means defining a second reel supporting axial portion and including a reel supporting surface concentric to said spindle axis of greater diameter dimension than said cylindrical surface, a first radially disposed reel positioning surface defined on said spindle outwardly disposed of said cylindrical surface at said second end thereof, a second radially disposed reel positioning means defined on said spindle outwardly radially disposed of said axial extending projection means and adjacent thereto and axially spaced from said cylindrical surface second end defining the termination of said spindle second axial portion adjacent said spindle support, at least one first radially extending key projecting from said cylindrical surface, and at least one second radially extending key axially aligned with said second spindle axial portion and outwardly radially disposed of said projection means.

2. A reel spindle as in claim 1 wherein said axial extending projection means reel supporting surface comprises a second cylindrical surface.

3. A reel spindle as in claim 2 wherein said second key radially extends from said second cylindrical surface.

4. A reel spindle as in claim 1 wherein reel retainer means are mounted upon said spindle adjacent said cylindrical surface first end movable between a reel loading position and a reel retaining position adapted to retain a reel upon said spindle.

5. A reel spindle as in claim 4 wherein said reel retainer means comprises an elongated lever pivotally mounted upon said spindle, said lever being pivotable from a loading position substantially axially aligned with said spindle axis and a retaining position transversely disposed to said spindle axis, and lever positioning means releasably positioning said lever in said positions.

6. A reel spindle as in claim 5 wherein said lever positioning means includes a spring biased detent mounted within said spindle and detent engaging means defined upon said lever.

7. A reel spindle as in claim 6 wherein said detent engaging means include a cam surface defined on said lever, said detent adapted to selectively engage said cam surface and bias said lever toward its reel retaining position upon said lever being pivoted from its loading position.

8. A reel spindle as in claim 1 wherein at least three radially extending first keys project from said cylindrical surface, said first keys being equally circumferentially spaced about said cylindrical surface and each including an outer terminating edge, said first keys outer terminating edge being radially spaced from the axis of said spindle a distance substantially equal to the radial dimension of said second axial portion reel supporting surface.

9. A reel spindle as in claim 8 wherein said second key is angularly displaced and nonaligned relative to said first keys about the axis of said spindle.

10. A reel spindle as in claim 9 wherein said first keys outer terminating edge is of a linear configuration disposed substantially parallel to said cylindrical surface.

References Cited

UNITED STATES PATENTS

| | | | |
|---|---|---|---|
| 3,315,909 | 4/1967 | Gerfast | 242—68.3 |
| 3,326,489 | 6/1967 | Lessler | 242—68.3 |

FRANK J. COHEN, *Primary Examiner.*

N. L. MINTZ, *Assistant Examiner.*